United States Patent
Zhuo et al.

(10) Patent No.: US 11,190,483 B2
(45) Date of Patent: Nov. 30, 2021

(54) ADDRESS COMPETITION METHOD OF MULTI-CONNECTION TYPE CONTROL SYSTEM

(71) Applicants: Qingdao Haier Air-conditioning Electronic Co., Ltd, Qingdao (CN); Haier Smart Home Co., Ltd., Qingdao (CN)

(72) Inventors: Baitian Zhuo, Qingdao (CN); Bin Shi, Qingdao (CN); Shaojiang Cheng, Qingdao (CN); Ruigang Zhang, Qingdao (CN); Jun Wang, Qingdao (CN)

(73) Assignees: Qingdao Haier Airconditioning Electronic Co., Ltd, Qingdao (CN); Haier Smart Home CO., LTD, Qingdao (CN)

( * ) Notice: Subject to any disclaimer, the term of this patent is extended or adjusted under 35 U.S.C. 154(b) by 0 days.

(21) Appl. No.: 16/970,647

(22) PCT Filed: Mar. 13, 2019

(86) PCT No.: PCT/CN2019/077990
§ 371 (c)(1),
(2) Date: Aug. 18, 2020

(87) PCT Pub. No.: WO2020/007063
PCT Pub. Date: Jan. 9, 2020

(65) Prior Publication Data
US 2021/0099418 A1    Apr. 1, 2021

(30) Foreign Application Priority Data
Jul. 5, 2018   (CN) .......................... 201810727880.0

(51) Int. Cl.
*H04L 29/12* (2006.01)
*H04W 8/26* (2009.01)
(Continued)

(52) U.S. Cl.
CPC ...... *H04L 61/2046* (2013.01); *H04L 12/2803* (2013.01); *H04L 29/12264* (2013.01);
(Continued)

(58) Field of Classification Search
CPC . H04L 61/2046; H04L 61/20; H04L 61/2038; H04L 61/10; H04L 61/15;
(Continued)

(56) References Cited

U.S. PATENT DOCUMENTS

2016/0360467 A1* 12/2016 Kotake ................ H04W 40/22

FOREIGN PATENT DOCUMENTS

| CN | 104896658 A | 9/2015 |
|---|---|---|
| CN | 106101299 A | 11/2016 |

(Continued)

OTHER PUBLICATIONS

International Search Report dated Jun. 13, 2019 in corresponding International application No. PCT/CN2019/077990; 4 pages.

*Primary Examiner* — Joshua Kading
(74) *Attorney, Agent, or Firm* — Maier & Maier

(57) ABSTRACT

An address competition method of a multi-connection type control system, intended to solve the problem of how to increase the efficiency of indoor air-conditioner unit address configuration where, according to the order in which a first slave control device initiates an address request, a relay device allocates, in sequence, temporary addresses to all first slave control devices, and according to the temporary addresses, initiates address requests in sequence to a master control device; according to the order in which a second slave control device initiates an address request, the master
(Continued)

control device allocates, in sequence, official addresses to all second slave control devices; according to the temporary addresses, the relay device allocates the official addresses to the corresponding first slave control devices. The method can efficiently allocate an address to an indoor air-conditioner unit, and ensures that the address of each indoor air-conditioner unit is unique.

10 Claims, 3 Drawing Sheets

(51) Int. Cl.
   *H04L 12/28* (2006.01)
   *H04W 84/20* (2009.01)
(52) U.S. Cl.
   CPC .......... *H04L 61/20* (2013.01); *H04L 61/2038* (2013.01); *H04W 8/26* (2013.01); *H04W 84/20* (2013.01); *H04L 2012/285* (2013.01)

(58) Field of Classification Search
   CPC . H04L 61/2007; H04L 61/25; H04L 61/2503; H04L 12/2803; H04L 12/2807; H04L 29/12264; H04L 29/12207; H04L 29/12018; H04L 29/12047; H04L 29/1233; H04L 2012/285; H04W 84/20; H04W 8/26
   See application file for complete search history.

(56) References Cited

FOREIGN PATENT DOCUMENTS

| | | | | |
|---|---|---|---|---|
| CN | 107249204 | A | * 10/2017 | |
| CN | 107257561 | A | * 10/2017 | ............ H04W 40/22 |
| CN | 107517282 | A | 12/2017 | |
| CN | 107707684 | A | 2/2018 | |
| EP | 1 429 083 | A1 | 6/2004 | |

* cited by examiner

ADDRESS COMPETITION METHOD OF MULTI-CONNECTION TYPE CONTROL SYSTEM

FIELD

The present disclosure belongs to the technical field of air conditioning, and specifically relates to an address competition method of a multi-connection type control system.

BACKGROUND

A multi-connection type system refers to an air conditioning system in which one outdoor unit is connected to two or more indoor units through pipes and in which a one-time refrigerant is used, wherein air-cooled heat exchange is applied on an outdoor side, and evaporative heat exchange is applied on an indoor side. With the development of science and technology, multi-connection type systems are widely used in large shopping malls and building groups, and people have raised higher and higher requirements on the area controlled by the multi-connection type systems.

The outdoor units of the multi-connection type system can control and adjust the indoor units independently to meet the requirements of different indoor units for different loads. Each outdoor unit can be connected to a plurality of indoor units which may be distributed in different rooms or even different buildings, and it is therefore necessary for the outdoor unit to communicate with the indoor units over a long distance. However, long-distance communication has problems such as signal attenuation and signal interference. At present, in order to extend the communication distance between the outdoor unit and the indoor units, high-performance communication chips are often used, or a relay device is added to realize one-to-one communication.

Although the use of high-performance communication chips can increase the communication distance to a certain extent, the extended communication distance is limited, and chips of the outdoor unit and the indoor units in the multi-connection type system need to be replaced at the same time, which requires expensive cost; current communication relay devices usually use data transparent transmission, which can only achieve one-to-one communication. If the communication distance is extended by increasing the number of relay devices, more and more relay devices will be added, and the cost of installation will become higher and higher.

How to ensure that the addresses of individual indoor units are unique and do not conflict with each other after connecting a plurality of indoor units through a plurality of relay devices is a current problem that needs to be solved by those skilled in the art. In the related art, the above problem is mostly solved by manually setting addresses of the indoor units, but this installation is troublesome and the efficiency is low.

Therefore, how to propose a solution to improve the efficiency of address configuration of the indoor units of the air conditioner is a problem that needs to be solved by those skilled in the art.

SUMMARY

In order to solve the above-mentioned problem in the related art, that is, to solve the problem of how to improve the efficiency of address configuration of the indoor units of the air conditioner, the present disclosure provides an address competition method of a multi-connection type control system, wherein the multi-connection type control system includes a master control device, a relay device, and a plurality of slave control devices; a part of the slave control devices are directly communicatively connected with the master control device, and another part of the slave control devices are communicatively connected with the master control device through the relay device; the address competition method includes:

sequentially allocating, by the relay device, a temporary address to each of first slave control devices according to an order in which the first slave control devices initiate an address request, and sequentially initiating address requests to the master control device according to the temporary addresses;

sequentially allocating, by the master control device, a formal address to each of second slave control devices according to an order in which the second slave control devices initiate an address request, and sequentially allocating a formal address corresponding to each of the temporary addresses to the relay device according to preset first reserved addresses and an order in which the relay device initiates the address requests; and sequentially allocating, by the relay device, the formal addresses to the corresponding first slave control devices according to the temporary addresses;

wherein the first slave control devices are slave control devices directly communicatively connected with the relay device, and the second slave control devices are slave control devices directly communicatively connected with the master control device; the first reserved addresses depend on the temporary addresses and whether the first slave control devices and the second slave control devices have been allocated formal addresses.

In a preferred technical solution of the above method, the step of "sequentially initiating address requests to the master control device according to the temporary addresses" includes:

sequentially sending, by the relay device, an address request corresponding to each of the temporary addresses to the master control device according to a preset time interval and a preset temporary address arrangement order.

In a preferred technical solution of the above method, in a case where the number of the relay device is plural, the step of "sequentially initiating address requests to the master control device according to the temporary addresses" further includes:

competing, by the plurality of relay devices, to send address requests of corresponding temporary addresses to the master control device according to the time interval and the temporary address arrangement order, respectively.

In a preferred technical solution of the above method, before the step of "sequentially allocating the formal address corresponding to each of the temporary addresses to the relay device according to the preset first reserved addresses and the order in which the relay device initiates the address requests", the method further includes:

judging whether all the second slave control devices have been allocated formal addresses; if yes, obtaining the formal addresses of the second slave control devices;

detecting whether there are first slave control devices that have been allocated the formal address, if yes, obtaining the formal addresses of the first slave control devices, and determining the first reserved addresses according to a preset address segment, the number of the temporary addresses, and the formal addresses of the first slave control devices and the second slave control devices; and if not, determining the first reserved addresses according to the address segment, the number of the temporary addresses, and the formal addresses of the second slave control devices.

In a preferred technical solution of the above method, after the step of "sequentially allocating the formal address corresponding to each of the temporary addresses to the relay device according to the preset first reserved addresses and the order in which the relay device initiates the address requests", the method further includes:

detecting whether there is a conflict between the formal address corresponding to each of the temporary addresses and the formal addresses of the second slave control devices; if yes, obtaining the temporary address corresponding to the conflicting formal address, and re-allocating a corresponding formal address to the obtained temporary address according to the first reserved addresses.

In a preferred technical solution of the above method, after the step of "sequentially allocating by the relay device the formal addresses to the corresponding first slave control devices according to the temporary addresses", the method further includes:

detecting, by the relay device, whether there are first slave control devices added; if yes, allocating temporary addresses to the added first slave control devices, and sequentially initiating address requests to the master control device according to the temporary addresses;

sequentially allocating, by the master control device, a formal address corresponding to each of the temporary addresses to the relay device according to preset second reserved addresses and the order in which the relay device initiates the address requests; and sequentially allocating, by the relay device, the formal addresses to the corresponding added first slave control devices according to the temporary addresses;

wherein the second reserved addresses depend on the temporary addresses, and the formal addresses of the first slave control devices and the second slave control devices before the first slave control devices are added.

In a preferred technical solution of the above method, before the step of "sequentially allocating by the relay device the temporary address to each of the first slave control devices according to the order in which the first slave control devices initiate the address request", the method further includes:

competing, by the first slave control devices, to send address requests to the corresponding relay devices.

In a preferred technical solution of the above method, before the step of "sequentially allocating by the master control device the formal address to each of the second slave control devices according to the order in which the second slave control devices initiate the address requests", the method further includes:

competing, by the second slave control devices, to send address requests to the master control device.

In a preferred technical solution of the above method, the method further includes: using a manual configuration method to allocate formal addresses to the first slave control devices and/or the second slave control devices.

In a preferred technical solution of the above method, the multi-connection type control system is a multi-connection type air conditioning system, the master control device is an air conditioner outdoor unit, and the slave control devices are air conditioner indoor units.

As compared with the closest related art, the above technical solutions have at least the following advantageous effects:

1. In the address competition method of the multi-connection type control system provided by the present disclosure, the relay devices can sequentially allocate a temporary address to each of the first slave control devices according to the order in which the first slave control devices initiate the address request, and the first slave control devices compete for the temporary addresses from the relay devices, so that the relay devices can efficiently allocate the temporary addresses to the first slave control devices; the relay devices then sequentially initiate address requests to the master control device according to the temporary addresses, and the relay devices compete for the formal addresses from the master control device so that the master control device can efficiently allocate the formal addresses to the relay devices.

2. In the address competition method of the multi-connection type control system provided by the present disclosure, the master control device sequentially allocates a formal address corresponding to each of the temporary addresses to the relay devices according to the preset first reserved addresses and the order in which the relay devices initiate the address request, which not only can ensure the uniqueness of the formal address of each first slave control device, but also can improve the utilization rate of the addresses in the master control device.

3. In the address competition method of the multi-connection type control system provided by the present disclosure, the relay devices can detect whether there is a conflict between the formal addresses of the first slave control devices and the second slave control devices, and if they conflict, a corresponding formal address is re-allocated to the first slave control device according to the temporary address of the first slave control device and the first reserved addresses, which further ensures the uniqueness of the formal addresses of the first slave control devices and the second slave control devices.

4. In the address competition method of the multi-connection type control system provided by the present disclosure, the relay devices can be connected to the master control device and a plurality of first slave control devices, and the communication distances between the master control device and the first slave control devices can be increased while maintaining the original communication chips of the master control device and the first slave control devices unchanged.

BRIEF DESCRIPTION

DETAILED DESCRIPTION

In order to make the objects, technical solutions and advantages of the embodiments of the present disclosure clearer, the technical solutions in the embodiments of the present disclosure will be described below clearly and completely in conjunction with the accompanying drawings in the embodiments of the present disclosure. Obviously, the embodiments described are only some of the embodiments of the present disclosure, not all of them. Based on the embodiments of the present disclosure, all other embodiments obtained by those skilled in the art without creative effort shall fall within the scope of protection of the present disclosure.

The preferred embodiments of the present disclosure are described below with reference to the drawings. Those skilled in the art should understand that these embodiments are only used to explain the technical principles of the present disclosure and are not intended to limit the scope of protection of the present disclosure.

Figure 1:
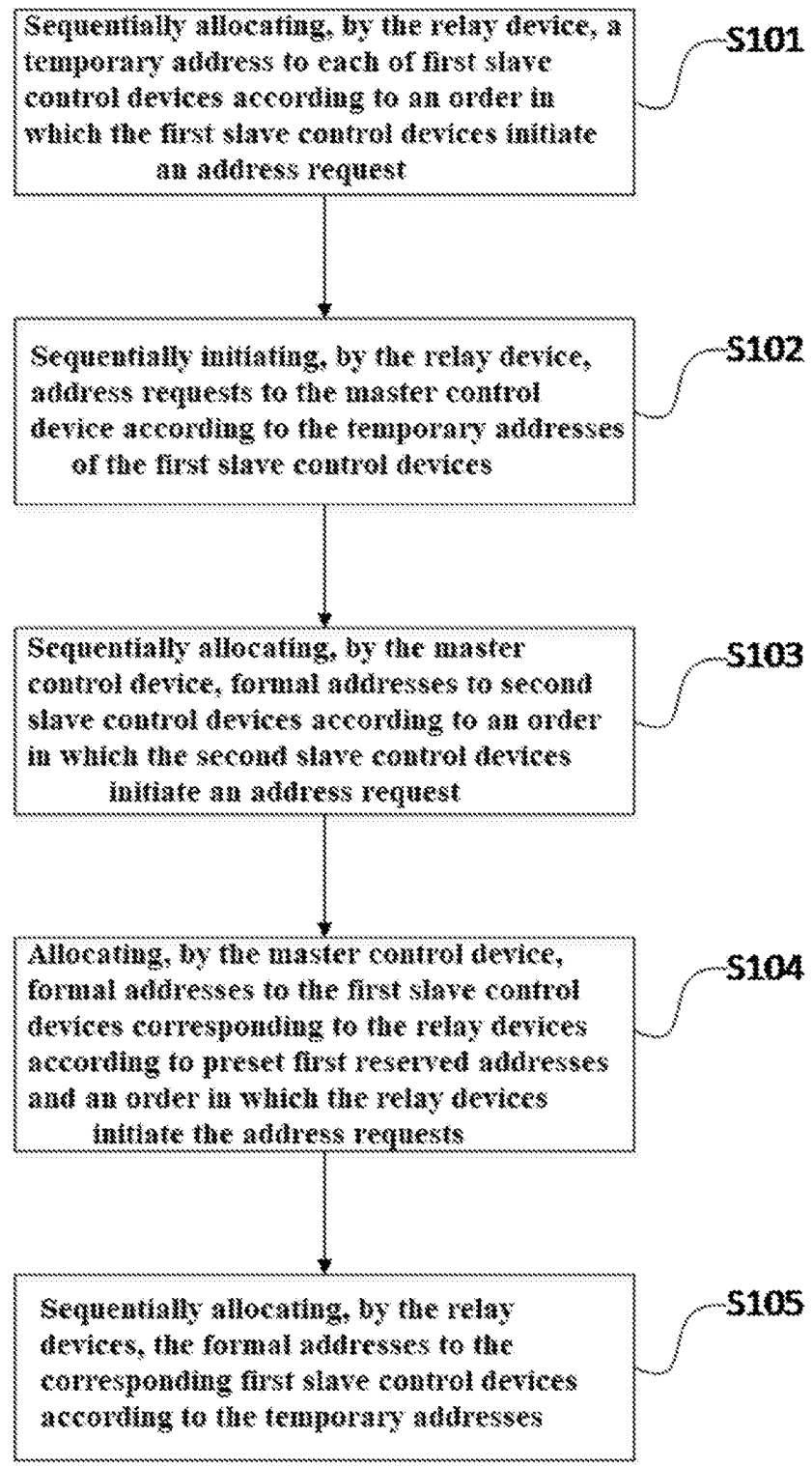
FIG. 1 is a schematic view showing main steps of an address competition method of a multi-connection type control system according to an embodiment of the present disclosure.

Reference is made to FIG. 1, which exemplarily shows main steps of an address competition method of a multi-connection type control system according to an embodiment of the present disclosure, wherein the multi-connection type control system mainly includes a master control device, a relay device and a plurality of slave control devices, a part of the slave control devices are directly communicatively connected with the master control device, and another part of the slave control devices are communicatively connected with the master control device through the relay device. As shown in FIG. 1, the address competition method of the multi-connection type control system in the embodiment of the present disclosure includes the following steps:

Step S101: sequentially allocating, by the relay device, a temporary address to each of first slave control devices according to an order in which the first slave control devices initiate an address request.

Figure 2:
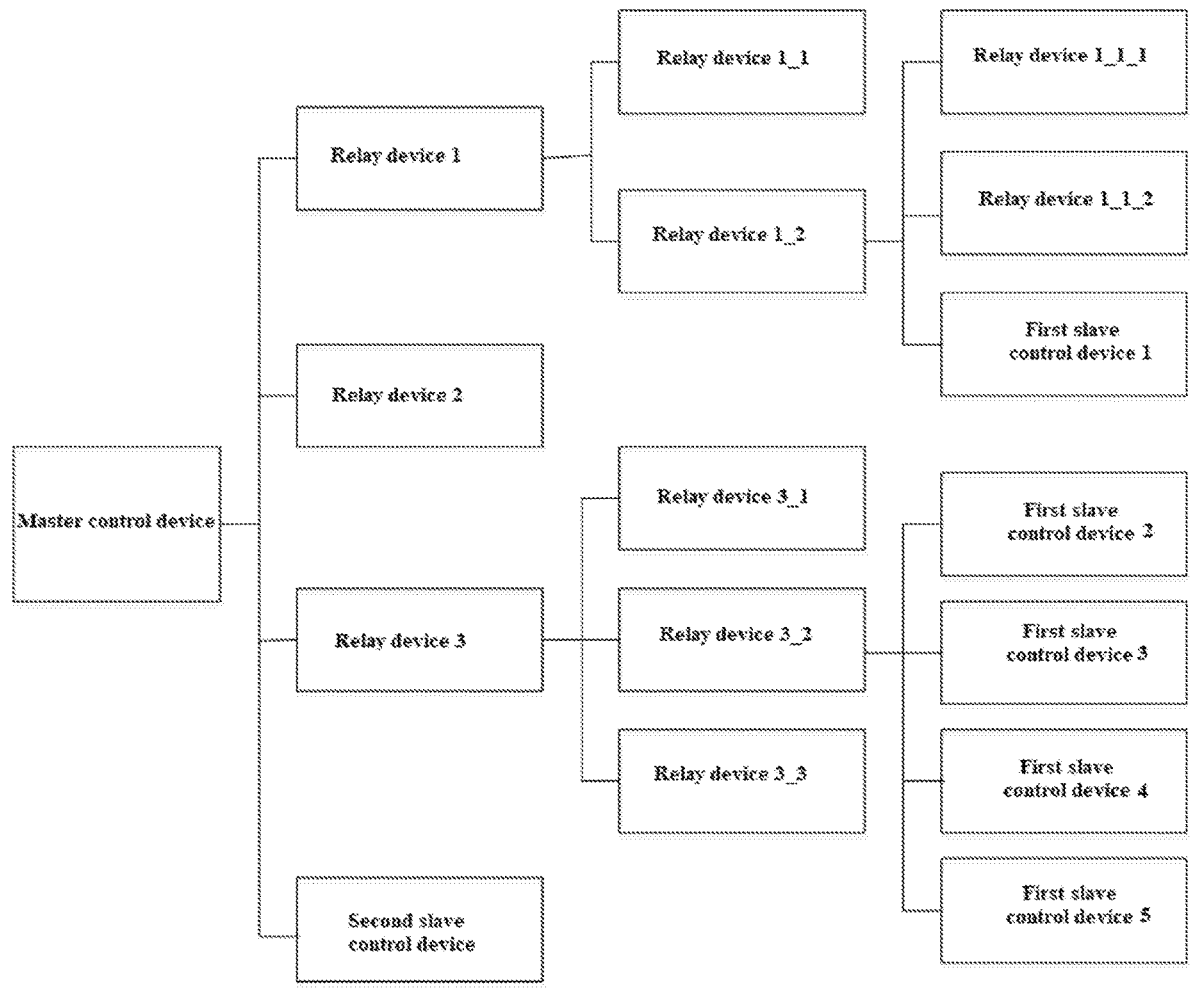
FIG. 2 is a schematic view of a main structure of a multi-connection type control system according to an embodiment of the present disclosure.

Reference is made to FIG. 2, which exemplarily shows a main structure of a multi-connection type control system according to an embodiment of the present disclosure. In the embodiment of the present disclosure, the multi-connection type control system may include a master control device, a relay device, and a plurality of slave control devices. The slave control devices may include first slave control devices and second slave control devices. The relay device may be directly communicatively connected with the first slave control devices, or may also be connected with the first slave control devices through connection with other relay devices. The first slave control devices may be slave control devices connected with the master control device through the relay devices, and the second slave control devices may be slave control devices directly communicatively connected with the master control device. The master control device is connected with three relay devices and one second slave control device. The three relay devices are relay device 1, relay device 2, and relay device 3 respectively, wherein the relay device 1 is connected to relay device 1_1 and relay device 1_2; the relay device 3 is connected to relay device 3_1, relay device 3_2, and relay device 3_3; the relay device 1_2 is connected to relay device 1_1_1, relay device 1_1_2 and the first slave control device 1; and the relay device 3_2 is connected to the first slave control device 2, the first slave control device 3, the first slave control device 4 and the first slave control device 5.

The master control device forms a first network com1 with devices directly connected thereto (which may be the relay devices or the second slave control devices), and the relay devices form a second network com2 with the first slave control devices. The multi-connection type control system may be a multi-connection type air-conditioning system, the master control device may be an air conditioner outdoor unit, and the slave control devices may be air conditioner indoor units.

In practical applications, according to on-site conditions or user requirements, a fixed address may be manually allocated to the first slave control device so as to well correspond to the location of the first slave control device; the first slave control devices may also compete for addresses automatically without manual setting, which leads to a convenient installation; during the actual installation of the first slave control devices, manual and automatic mixed installation may be carried out according to on-site requirements.

Figure 3:
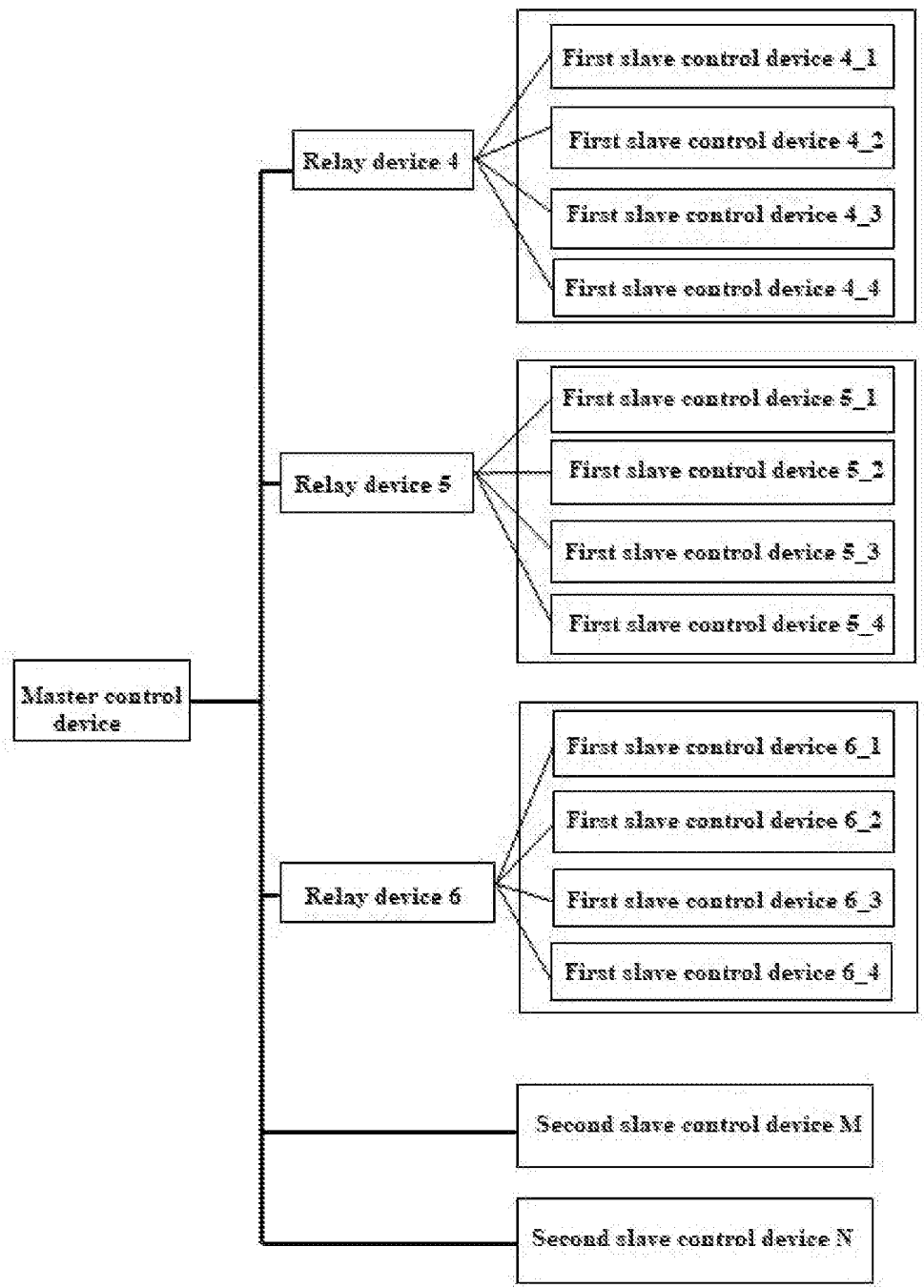
FIG. 3 is a schematic view of a main structure of a multi-connection type control system according to another embodiment of the present disclosure.

With continued reference to FIG. 3, a main structure of a multi-connection type control system according to another embodiment of the present disclosure is given. In the embodiment of the present disclosure, the multi-connection type control system may include a master control device, a plurality of relay devices, a plurality of first slave control devices and a plurality of second slave control devices. The master control device may be connected to three relay devices and two second slave control devices. The three relay devices are relay device 4, relay device 5, and relay device 6 respectively, and the two second slave control devices are second slave control device M and second slave control device N respectively. The relay device 4 is connected to the first slave control device 4_1, the first slave control device 4_2, the first slave control device 4_3, and the first slave control device 4_4; the relay device 5 is connected to the first slave control device 5_1, the first slave control device 5_2, the first slave control device 5_3 and the first slave control device 5_4; and the relay device 6 is connected to the first slave control device 6_1, the first slave control device 6_2, the first slave control device 6_3 and the first slave control device 6_4.

The first slave control device initiates an address request to the relay device, requesting the relay device to allocate a temporary address to the first slave control device. In the actual application process, a factory address of each first slave control device is set to 0# by default. Each first slave control device initiates an address request to the relay device. A certain number of temporary addresses are stored in the relay device. According to an order in which the first slave control devices initiate the address request, a temporary address is allocated to each first slave control device sequentially, and the first slave control devices compete for the temporary addresses from the relay device.

Specifically, taking the relay device 4 and the first slave control devices connected to the relay device 4 as an example for description, the first slave control device 4_1, the first slave control device 4_2, the first slave control device 4_3, and the first slave control device 4_4 compete to send a temporary address request to the relay device 4. Only one first slave control device can send the temporary address request successfully each time. Assuming that at the first time, the first slave control device 4_2 successfully sends the temporary address request, the relay device 4 allocates a temporary address 0# to the first slave control device 4_2, and the remaining first slave control devices continue to compete for temporary addresses. Each time, the relay device 4 only allocates a temporary address to the first slave control device that successfully sends the temporary address request, until all the first slave control devices are allocated the temporary address. The temporary addresses may be allocated in an order from small to large.

By analogy, the temporary addresses allocated by other relay devices to the first slave control devices connected thereto can be obtained, specifically as shown in Table 1 below:

TABLE 1 temporary addresses allocated by relay devices to the first slave control devices connected thereto

| Network COM2 | First slave control device | temporary address |
|---|---|---|
| Relay device 4 | First slave control device 4_1 (automatic) | 2# |
|  | First slave control device 4_2 (automatic) | 0# |
|  | First slave control device 4_3 (automatic) | 1# |
|  | First slave control device 4_4 (automatic) | 3# |
| Relay device 5 | First slave control device 5_1 (automatic) | 3# |
|  | First slave control device 5_2 (manual) | 1# |
|  | First slave control device 5_3 (automatic) | 0# |
|  | First slave control device 5_4 (automatic) | 2# |
| Relay device 6 | First slave control device 6_1 (manual) | 5# |
|  | First slave control device 6_2 (manual) | 6# |
|  | First slave control device 6_3 (manual) | 9# |
|  | First slave control device 6_4 (automatic) | 0# |

Optionally, the temporary addresses and the formal addresses referred to in the present disclosure may be communication addresses sorted by numbering, or may be different address types such as network address and physical address, which can be used as long as the address where the device is located can be accurately characterized. Embodiments of the present disclosure do not limit the specific implementation of the address type.

Step S102: sequentially initiating, by the relay device, address requests to the master control device according to the temporary addresses of the first slave control devices.

Specifically, the relay device may either store a certain number of temporary addresses and allocate them to the first slave control devices, or initiate an address request to the master control device, requesting the master control device to allocate a formal address to it. The relay device then allocates the formal address to the corresponding first slave control device. After the relay device allocates the temporary addresses to the first slave control devices, it waits for a preset time (such as 20 seconds), and the relay device counts the number of the first slave control devices that automatically compete for addresses in the second network so as to apply for formal addresses having the corresponding number in the first network. As shown in Table 1 above, some of the first slave control devices have been allocated formal addresses, and the first slave control devices that have been allocated the temporary addresses compete for the formal addresses. Specifically, the relay devices can apply for 8 formal addresses for the first slave control devices, specifically as shown in Table 2 below:

TABLE 2 number of formal addresses applied for by the relay devices for the first slave control devices connected thereto

| Network COM2 | Number of formal addresses applied for |
|---|---|
| Relay device 4 | 4 |
| Relay device 5 | 3 |
| Relay device 6 | 1 |

The relay devices sequentially initiates the address request to the master control device according to the temporary addresses of the first slave control devices. Each time, each relay device initiates the address request for only one first slave control device, and each time, the relay device sequentially initiates the address request according to the temporary addresses of the first slave control devices.

Specifically, the relay device 4 sequentially initiates the request applying for an formal address for the first slave control device 4_2, the first slave control device 4_3, the first slave control device 4_1, and the first slave control device 4_4 connected thereto; the relay device 5 sequentially initiates the request applying for an formal address for the first slave control device 5_3, the first slave control device 5_4, and the first slave control device 5_1 connected thereto; and the relay device 6 initiates the request applying for an formal address for the first slave control device 6_4 connected thereto.

Step S103: sequentially allocating, by the master control device, formal addresses to second slave control devices according to an order in which the second slave control devices initiate an address request.

In a preferred implementation of the embodiment, the second slave control devices are directly connected to the master control device, and the master control device sequentially allocates formal addresses to the second slave control devices according to an order in which the second slave control devices initiate an address request. Taking the number of second slave control devices being two as an example for description, the master control device allocates formal addresses to the second slave control devices as shown in Table 3 below:

TABLE 3 formal addresses allocated by the master control device to the second slave control devices

| Network COM1 | Formal address |
|---|---|
| Second slave control device M (automatic) | 0# |
| Second slave control device N (manual) | 3# |

Step S104: allocating, by the master control device, formal addresses to the first slave control devices corresponding to the relay devices according to preset first reserved addresses and an order in which the relay devices initiate the address requests.

Specifically, the first reserved addresses depend on the temporary addresses and whether the first slave control devices and the second slave control devices have been allocated formal addresses. The first reserved addresses are formal address which are reserved by the master control device according to the number of the temporary addresses and which have the same number as the temporary addresses, after the second slave control devices and part of the first slave control devices have been allocated formal addresses.

In order to efficiently use the available addresses in the master control device, before allocating the formal address, it may be judged whether the second slave control devices are all allocated a formal address, and if yes, the formal addresses of the second slave control devices are obtained; it is detected whether there are first slave control devices that have been allocated a formal address, and if yes, the formal addresses of the first slave control devices are obtained. The first reserved addresses are addresses that are determined to be reserved for the first slave control devices which compete for the formal addresses according to a preset address segment, the number of temporary addresses, and formal addresses of the second slave control devices and part of the first slave control devices, after the formal addresses of the second slave control devices and the part of the first slave control devices are obtained by the master control device.

In the following, the multi-connection type control system shown in FIG. 3 and Tables 1 and 3 will be used as an example to describe the process of the relay devices initiating the address requests.

The existing formal addresses in the master control device are 0#, 1#, 3#, 5#, 6# and 9#, and the relay devices compete for the remaining formal addresses, wherein the remaining formal addresses may be addresses arranged in an order from small to large or from large to small.

The first round of competition.

The first slave control devices compete to send the temporary addresses to the relay devices, and the relay devices apply for formal addresses for the corresponding first slave control devices according to the temporary addresses. Specifically, the relay device 4, the relay device 5, and the relay device 6 compete to send formal address requests to the master control device, and only one relay device can successfully send the formal address request each time. Assuming that the relay device 5 successfully sends the formal address request at the first time, the master control device allocates a formal address 2# to the first slave control device 5_3 corresponding to the relay device 5; assuming that the relay device 4 successfully sends the formal address request at the second time, the master control device allocates a formal address 4# to the first slave control device 4_2 corresponding to the relay device 4; the remaining relay devices continue to compete for the formal addresses. Assuming that the relay device 6 successfully sends the formal address request at the third time, the master control device allocates a formal address 7# to the first slave control device 6_4 corresponding to the relay device 6. All the first slave control devices connected to the relay device 6 are allocated formal addresses, and the relay device 6 does not participate in subsequent competition.

Each time, the master control device only allocates a formal address to the relay device that successfully sends the formal address request, until each relay device is allocated a formal address at each time of formal address request; after each relay device sends the formal address request through competition, the first round of competition ends, and then the second round of competition is performed until the first slave control devices connected to each relay device are each allocated a formal address.

The second round of competition.

The relay device 4 and the relay device 5 continue to compete to send formal address requests to the master control device. Assuming that in the second round of competition, the relay device 5 successfully sends the formal address request at the first time, the master control device allocates a formal address 8# to the first slave control device 5_4 corresponding to the relay device 5; then the relay device 4 sends the formal address request to the master control device through competition, and the master control device allocates a formal address 10# to the first slave control device 4_3 corresponding to the relay device 4.

The third round of competition.

The relay device 4 and the relay device 5 continue to compete to send formal address requests to the master control device. Assuming that in the third round of competition, the relay device 4 successfully sends the formal address request at the first time, the master control device allocates a formal address 11# to the first slave control device 4_1 corresponding to the relay device 4; then the relay device 5 sends the formal address request to the master control device through competition, and the master control device allocates a formal address 12# to the first slave control device 5_1 corresponding to the relay device 5. All the first slave control devices connected to the relay device 5 are allocated formal addresses, and the relay device 5 does not participate in subsequent competition.

The fourth round of competition.

The relay device 4 continues to send the formal address request to the master control device, and the master control device allocates a formal address 12# to the first slave control device 4_4 corresponding to the relay device 4. Till now, all the first slave control devices connected to the relay devices are allocated the formal addresses, and the competition ends. The specific results are shown in Table 4 below.

TABLE 4 result of relay devices competing for formal addresses for their corresponding first slave control devices

| Network COM1 | 1st round of competition | 2nd round of competition | 3rd round of competition | 4th round of competition |
|---|---|---|---|---|
| Second slave control device M (automatic) | 0# | 0# | 0# | 0# |
| Second slave control device N (manual) | 3# | 3# | 3# | 3# |
| Relay device 4 | 4# (compete) | 4#/10# (compete) | 4#/10#/11# (compete) | 4#/10#/11#/13# (compete) |
| Relay device 5 | 1# (manual), 2# (compete) | 1# (manual), 2#/8# (compete) | 1# (manual), 2#/8#/12#(compete) | 1# (manual), 2#/8#/12# (compete) |
| Relay device 6 | 5#/6#/9# (manual), 7# (compete) | 5#/6#/9# (manual), 7# (compete) | 5#/6#/9# (manual), 7# (compete) | 5#/6#/9# (manual), 7# (compete) |

In a preferred implementation of the embodiment of the present disclosure, after each round of competition is over, a preset time (such as 20 seconds) is waited for, and the next round of competition is performed after the communication is stable so that address confirmation can be made.

In a preferred implementation of the embodiment of the present disclosure, after the step of "allocating by the master control device the formal addresses to the first slave control devices corresponding to the relay devices according to the preset first reserved addresses and the order in which the relay devices initiate the address requests", the relay device detects whether there is a conflict between the formal address corresponding to each of the temporary addresses and the formal addresses of the second slave control devices, and if yes, the temporary address corresponding to the conflicting formal address is obtained, and a corresponding formal address is re-allocated to the obtained temporary address according to the first reserved addresses, which further ensures the uniqueness of the formal addresses of the first slave control devices and the second slave control devices.

Step S105: sequentially allocating, by the relay devices, the formal addresses to the corresponding first slave control devices according to the temporary addresses.

After the relay device obtains the formal addresses from the master control device according to the temporary addresses of the first slave control devices through competition, it sequentially allocates the formal address to the first slave control devices according to the temporary addresses of the first slave control devices.

Based on the strategy that the master control device sequentially allocates formal addresses to the first slave control devices corresponding to the relay devices according to the order of the temporary addresses, a correspondence of "temporary address-formal address" may be established. During the operation of the relay devices, they may detect whether new first slave control device are added. If yes, the master control device sequentially allocates the formal addresses corresponding to the temporary addresses to the relay devices according to preset second reserved addresses, the order in which the relay devices initiate the address request, and the correspondence of "temporary address-formal address", and the relay devices sequentially allocate the formal addresses to the corresponding newly added first slave control devices according to the temporary addresses.

The second reserved addresses depend on the temporary addresses, and the formal addresses of the first slave control devices and the second slave control devices before the added first slave control devices. The second reserved addresses are formal addresses which are reserved by the master control device according to the added first slave control devices and which have the same number as the added first slave control devices, after the first slave control devices and the second slave control devices have been allocated formal addresses and formal address having the same number as the temporary addresses are reserved for the temporary addresses.

In a preferred embodiment of the embodiment of the present disclosure, the relay device may send parameters of the first slave control devices to the master control device. The parameters of the first slave control devices may include motor wind speed, set temperature, expansion valve opening, etc., and the master control device may send the addresses to the first slave control devices through the relay devices. By connecting the master control device and the first slave control devices through the relay devices, the communication distance can be extended while maintaining the chips of the master control device and the first slave control devices unchanged. The relay device may include at least two chips, one of which communicates with the master control device, and the other of which communicates with the first slave control devices. Assuming that the communication distance is 1000 meters in a case where the master control device and the first slave control devices are directly connected, the communication distance can be increased to 4000 meters after the relay devices are added.

The steps of the method or algorithm described in combination with the embodiments disclosed herein may be implemented by hardware, a software module executed by a processor, or a combination of the two. The software module may be placed in a random access memory (RAM), a memory, a read-only memory (ROM), an electrically programmable ROM, an electrically erasable programmable ROM, a register, a hard disk, a removable disks, a CD-ROM, or any other forms of storage media known in the art.

Those skilled in the art should recognize that the method steps of the examples described in the embodiments disclosed herein may be implemented by electronic hardware, computer software or a combination of the two. In order to clearly illustrate the interchangeability of the electronic hardware and the software, the composition and steps of each example have been generally described above in terms of the function. Whether these functions are performed by electronic hardware or software depends on the specific application and design constraints of the technical solution. Those skilled in the art may use different methods for each specific application to implement the described functions, but such implementation should not be considered as going beyond the scope of the present disclosure.

It should be noted that the terms "first", "second" and the like in the description, claims and the above drawings of the present disclosure are used to distinguish similar objects, rather than describing or indicating a specific order or temporal sequence. It should be understood that the numbers used in this way can be interchanged under appropriate circumstances so that the embodiments of the present disclosure described herein can be implemented in an order other than those illustrated or described herein.

Hitherto, the technical solutions of the present disclosure have been described in conjunction with the preferred embodiments shown in the accompanying drawings, but it is easily understood by those skilled in the art that the scope of protection of the present disclosure is obviously not limited to these specific embodiments. Without departing from the principle of the present disclosure, those skilled in the art can make equivalent changes or replacements to relevant technical features, and the technical solutions after these changes or replacements will fall within the scope of protection of the present disclosure.

What is claimed is:

1. An address competition method of a multi-connection type control system, wherein the multi-connection type control system comprises a master control device, a relay device, and a plurality of slave control devices; a part of the slave control devices are directly communicatively connected with the master control device, and another part of the slave control devices are communicatively connected with the master control device through the relay device;

the address competition method comprising:
sequentially allocating, by the relay device, a temporary address to each of first slave control devices according to an order in which the first slave control devices initiate an address request, and sequentially initiating address requests to the master control device according to the temporary addresses;
sequentially allocating, by the master control device, a formal address to each of second slave control devices according to an order in which the second slave control devices initiate an address request, and sequentially allocating a formal address corresponding to each of the temporary addresses to the relay device according to preset first reserved addresses and an order in which the relay device initiates the address requests; and sequentially allocating, by the relay device, the formal addresses to the corresponding first slave control devices according to the temporary addresses;

wherein the first slave control devices are slave control devices directly communicatively connected with the relay device, and the second slave control devices are slave control devices directly communicatively connected with the master control device; the first reserved addresses depend on the temporary addresses and whether the first slave control devices and the second slave control devices have been allocated formal addresses.

2. The address competition method of the multi-connection type control system according to claim 1, wherein the step of sequentially initiating address requests to the master control device according to the temporary addresses comprises:

sequentially sending, by the relay device, an address request corresponding to each of the temporary addresses to the master control device according to a preset time interval and a preset temporary address arrangement order.

3. The address competition method of the multi-connection type control system according to claim 2, wherein in a case where there are a plurality of relay devices that include the relay device, the step of sequentially initiating address requests to the master control device according to the temporary addresses further comprises:

competing, by the plurality of relay devices, to send address requests of corresponding temporary addresses to the master control device according to the time interval and the temporary address arrangement order, respectively.

4. The address competition method of the multi-connection type control system according to claim 1, wherein before the step of sequentially allocating the formal address corresponding to each of the temporary addresses to the relay device according to the preset first reserved addresses and the order in which the relay device initiates the address requests, the method further comprises:

judging whether all the second slave control devices have been allocated formal addresses; if yes, obtaining the formal addresses of the second slave control devices;

detecting whether there are first slave control devices that have been allocated the formal address, if yes, obtaining the formal addresses of the first slave control devices, and determining the first reserved addresses according to a preset address segment, the number of the temporary addresses, and the formal addresses of the first slave control devices and the second slave control devices; and if not, determining the first reserved addresses according to the address segment, the number of the temporary addresses, and the formal addresses of the second slave control devices.

5. The address competition method of the multi-connection type control system according to claim 4, wherein after the step of sequentially allocating the formal address corresponding to each of the temporary addresses to the relay device according to the preset first reserved addresses and the order in which the relay device initiates the address requests, the method further comprises:

detecting whether there is a conflict between the formal address corresponding to each of the temporary addresses and the formal addresses of the second slave control devices; if yes, obtaining the temporary address corresponding to the conflicting formal address, and re-allocating a corresponding formal address to the obtained temporary address according to the first reserved addresses.

6. The address competition method of the multi-connection type control system according to claim 1, wherein after the step of sequentially allocating by the relay device the formal addresses to the corresponding first slave control devices according to the temporary addresses, the method further comprises:

detecting, by the relay device, whether there are first slave control devices added; if yes, allocating temporary addresses to the added first slave control devices, and sequentially initiating address requests to the master control device according to the temporary addresses;

sequentially allocating, by the master control device, a formal address corresponding to each of the temporary addresses to the relay device according to preset second reserved addresses and the order in which the relay device initiates the address requests; and sequentially allocating, by the relay device, the formal addresses to the corresponding added first slave control devices according to the temporary addresses;

wherein the second reserved addresses depend on the temporary addresses, and the formal addresses of the first slave control devices and the second slave control devices before the first slave control devices are added.

7. The address competition method of the multi-connection type control system according to claim 1, wherein before the step of sequentially allocating by the relay device the temporary address to each of the first slave control devices according to the order in which the first slave control devices initiate the address request, the method further comprises:

competing, by the first slave control devices, to send address requests to one or more corresponding relay devices.

8. The address competition method of the multi-connection type control system according to claim 1, wherein before the step of sequentially allocating by the master control device the formal address to each of the second slave control devices according to the order in which the second slave control devices initiate the address request, the method further comprises:

competing, by the second slave control devices, to send address requests to the master control device.

9. The address competition method of the multi-connection type control system according to claim 1, further comprising:

allocating formal addresses to the first slave control devices and/or the second slave control devices manually.

10. The address competition method of the multi-connection type control system according to claim 1, wherein the multi-connection type control system is a multi-connection type air conditioning system, the master control device is an air conditioner outdoor unit, and the slave control devices are air conditioner indoor units.

* * * * *